United States Patent
Schwörer et al.

(10) Patent No.: US 6,733,217 B2
(45) Date of Patent: May 11, 2004

(54) WORKPIECE HOLDING MEANS FOR MACHINE TOOLS AND MORE ESPECIALLY FOR MILLING AND/OR DRILLING MACHINES

(75) Inventors: Tobias Schwörer, Königsheim (DE); Franz-Xaver Bernhard, Spaichingen (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 0 days.

(21) Appl. No.: 10/155,025

(22) Filed: May 28, 2002

(65) Prior Publication Data

US 2003/0129035 A1 Jul. 10, 2003

(30) Foreign Application Priority Data

May 29, 2001 (EP) ............................................. 01113044

(51) Int. Cl.⁷ ............................. B23C 1/14; B23C 9/00; B23B 39/06; B23Q 5/34
(52) U.S. Cl. ...................... 409/168; 409/224; 409/165; 408/71; 269/61; 269/71; 269/57
(58) Field of Search ................................. 409/168, 165, 409/224, 221; 408/71; 269/57, 61, 71

(56) References Cited

U.S. PATENT DOCUMENTS

| | | | | |
|---|---|---|---|---|
| 1,127,969 A | * | 2/1915 | Dolder | 269/61 |
| 3,564,972 A | * | 2/1971 | Firth et al. | 409/165 |
| 3,700,228 A | * | 10/1972 | Peale | 269/61 |
| 4,369,958 A | * | 1/1983 | Maynard | 269/61 |
| 4,550,872 A | * | 11/1985 | Ohnishi | 269/61 |
| 4,661,678 A | * | 4/1987 | Wavre | 269/71 |
| 4,687,901 A | | 8/1987 | Binder et al. | |
| 4,712,282 A | * | 12/1987 | Romeu | 409/168 |
| 4,767,109 A | * | 8/1988 | Raketich | 269/61 |
| 5,117,552 A | * | 6/1992 | Babel | 409/235 |
| 5,678,291 A | * | 10/1997 | Braun | 409/202 |
| 5,727,296 A | * | 3/1998 | Kobler | 409/165 |
| 5,913,744 A | * | 6/1999 | Rennerfelt | 475/163 |
| 5,919,011 A | * | 7/1999 | Schweizer | 409/131 |
| 6,298,531 B1 | * | 10/2001 | Baumbusch et al. | 29/40 |
| 6,332,604 B1 | * | 12/2001 | Chu | 269/71 |
| 6,394,892 B2 | * | 5/2002 | Hanisch et al. | 451/259 |
| 2002/0006764 A1 | * | 1/2002 | Hanisch et al. | 451/1 |
| 2003/0053875 A1 | * | 3/2003 | Pasquetto | 409/192 |

FOREIGN PATENT DOCUMENTS

| | | |
|---|---|---|
| CH | 339 458 | 6/1959 |
| DE | 3624284 | 2/1987 |

(List continued on next page.)

OTHER PUBLICATIONS

Patent Abstract of Japan, Publication No. 60080536, Publication Date, May 8, 1985, "Shaft Rotation Supporting Device", Kikuchi.

*Primary Examiner*—Erica Cadugan
(74) *Attorney, Agent, or Firm*—Browdy and Neimark, P.L.L.C.

(57) ABSTRACT

A workpiece holding means for machine tools and more particularly for milling and/or drilling machines, comprising a pivoting bridge supported between two bearing walls. The bearing walls respectively laterally delimit a working area. At least one drive motor serves for pivoting the pivoting bridge, such motor being arranged outside the working area on at least one outer side of the bearing walls. The pivoting bridge is provided with a gear ring adjacent to one or both of the inner sides of the bearing walls, such gear ring being drivingly connected with the drive gear wheel driven by at least one drive motor. The bearing points or bearing pins of the pivoting bridge accordingly do not have to transmit any drive torque and are not subjected to any torque load so that more precise running and more precise positioning is possible.

20 Claims, 2 Drawing Sheets

FOREIGN PATENT DOCUMENTS

| | | |
|---|---|---|
| DE | 195 27 507 | 10/1996 |
| DE | 10049810 A1 * | 4/2002 |
| EP | 0 305 944 | 3/1989 |
| EP | 0 712 682 | 5/1996 |
| EP | 0 744 244 | 11/1996 |
| EP | 001216788 A1 * | 6/2002 |
| JP | 57-178627 A * | 11/1982 |
| JP | 59-142035 A * | 8/1984 |
| WO | WO-98/57777 A1 * | 12/1998 |

* cited by examiner

WORKPIECE HOLDING MEANS FOR MACHINE TOOLS AND MORE ESPECIALLY FOR MILLING AND/OR DRILLING MACHINES

BACKGROUND OF THE INVENTION

The invention relates to a workpiece holding means for machine tools and more particularly for milling and/or drilling machines, comprising a pivoting bridge more particularly possessing two bearing pins for the pivotal support between two bearing walls respectively laterally delimiting a working area, and furthermore at least one drive motor for pivoting the pivoting bridge, such motor being arranged outside the said working area on at least one outer side of the bearing walls.

THE PRIOR ART

The use of such pivoting bridges as workpiece holding means for machine tools is for example disclosed in the European patent publication 0712682 or in the German patent publication 3,624,284 C2. The drive motor is in each case arranged externally on one of the two bearing walls, i.e. clear of the working area in order to protect same from shavings produced in the course of machining and from lubricating substances and coolants. This externally mounted drive motor drive drives, at this position, one of the bearing pins so that same must transmit the entire driving torque from the bearing pin to the pivoting bridge. More particularly in the case of high precision machining the torque on the bearing pin has turned out to be disadvantageous, since effects are produced on the accuracy of positioning and the running behavior.

SHORT SUMMARY OF THE INVENTION

One object of the invention is to so improve a workpiece holding means of the type initially mentioned that if the drive motor is externally mounted torque forces on the bearing pins may be prevented.

In order to achieve these and/or other objects appearing from the present specification, claims and drawings, in the present invention the pivoting bridge is provided with a gear ring at one or both of the two inner sides of the bearing walls, such gear ring being drivingly connected with a drive gear wheel itself driven by the at least one drive motor.

There is the advantage that not only a bearing pin but also the pivoting bridge is driven directly by way of its gear ring so that there is a short power transmission path and no torque load on the bearing pins. This leads to improved running properties and to a greater accuracy of positioning. As regards precise bearing means the bearing pins may be optimized without paying heed to the drive means.

The measures recited in the claims represent advantageous further developments and improvements of the invention.

The drive motor and/or a drive shaft driven by it and provided with a drive gear wheel extend at least partially from the outside through the bearing wall. This means that simple dismounting of the drive for the pivoting bridge is possible, for example by detaching the drive motor from the bearing wall and drawing it outward together with the drive gear wheel.

The gear ring and the drive gear wheel are preferably in mesh with each other or connected together by way of a drive train such as a sprocket chain or a toothed belt.

In an advantageous form of the invention the drive gear ring extends into an annular or disk-like recess in the inner side of the bearing wall at least partially so that it is substantially protected against matter produced in the course of machining such as shavings or the like.

In accordance with an advantageous design of the invention the drive gear ring is attached to of formed on a disk-like area of the pivoting bridge and more particularly on a flat side thereof facing the bearing wall. The disk-like area accordingly serves not only as a holding socket for the gear ring but also additionally for screening off from the working area, more especially in the case of an arrangement of the gear ring let into the bearing wall.

In order to achieve an even better sealing effect for the gear wheel drive to shut it off from the working area it is an advantage to arrange a seal ring for sealing the drive gear ring and/or the drive gear wheel between the disk-like area of the pivoting bridge and the inner side of the corresponding bearing wall, the face of engagement between the sealing ring and the disk-like area or the inner side of the bearing wall preferably being in the form of a plain bearing means and/or a labyrinth seal face. Accordingly it is possible for the gear ring or, respectively, the drive gear wheel to be reliably protected or sealed from liquids and lubricants required for machining.

In accordance with an advantageous development of the invention at least one of the bearing pins, which are more especially supported in bearing sleeves, contains a concentric, motor-driven drive shaft, which drives, by way of an power transmission train, running in or on the pivoting bridge, at least one workpiece table supported in a rotatable manner on the pivoting bridge. Such a drive, which in principle is disclosed in the initially mentioned prior art, for a workpiece table through the bearing pin can be designed for substantially more simply, if in accordance with the invention the bearing pin is not required from the pivotal drive of the pivoting bridge.

The drive motor for the drive shaft in the bearing pin is secured to the latter in a manner preventing relative rotation so that the pivotal motion of the pivoting bridge is decoupled for the rotary movement of the workpiece table.

The torsion force acting on the pivoting bridge may be further reduced if the pivoting bridge has two gear rings at the inner sides of the two bearing walls and if two drive motors are provided for a synchronous drive of such two gear rings.

The diameter of the gear ring is preferably substantially larger than the diameter of the drive gear wheel, something which contributes to increasing precision of positioning of the pivoting bridge. Furthermore, for the drive motor a transmission with an extremely low step-down transmission ratio may be selected, or it is even possible to completely do without such a step-down transmission.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
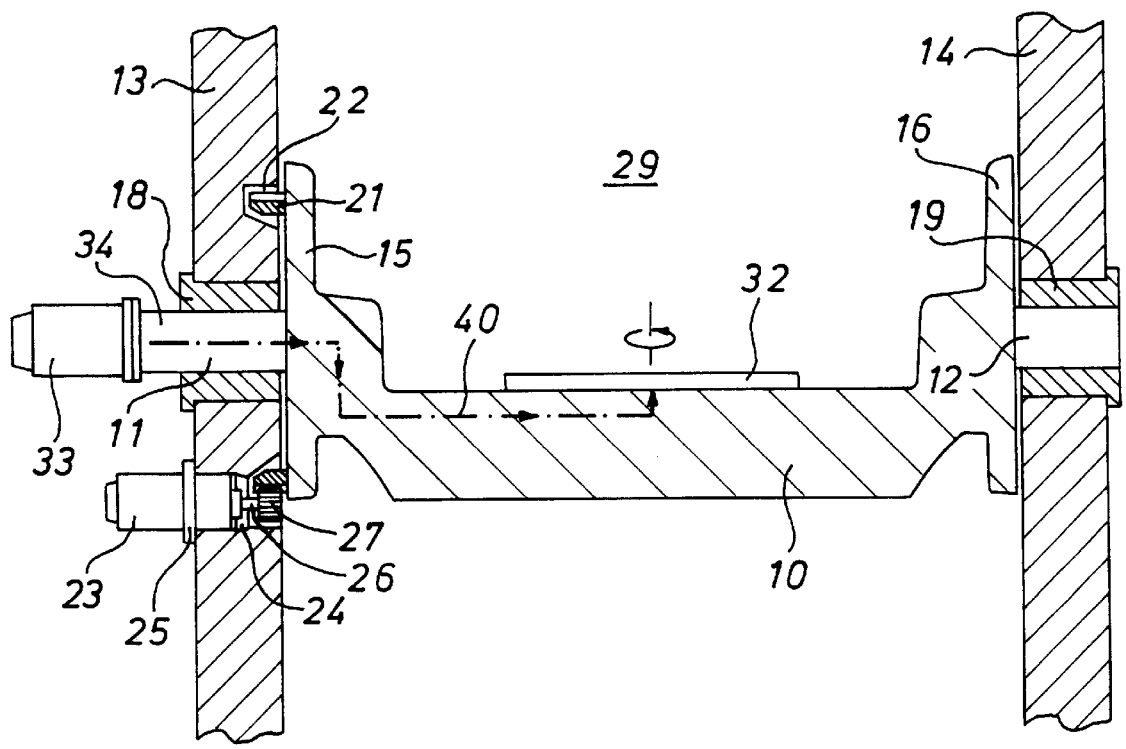
FIG. 1 shows a diagrammatic overall elevation of a pivoting bridge pivotally supported between two bearing walls as an embodiment of the invention.
Figure 2:
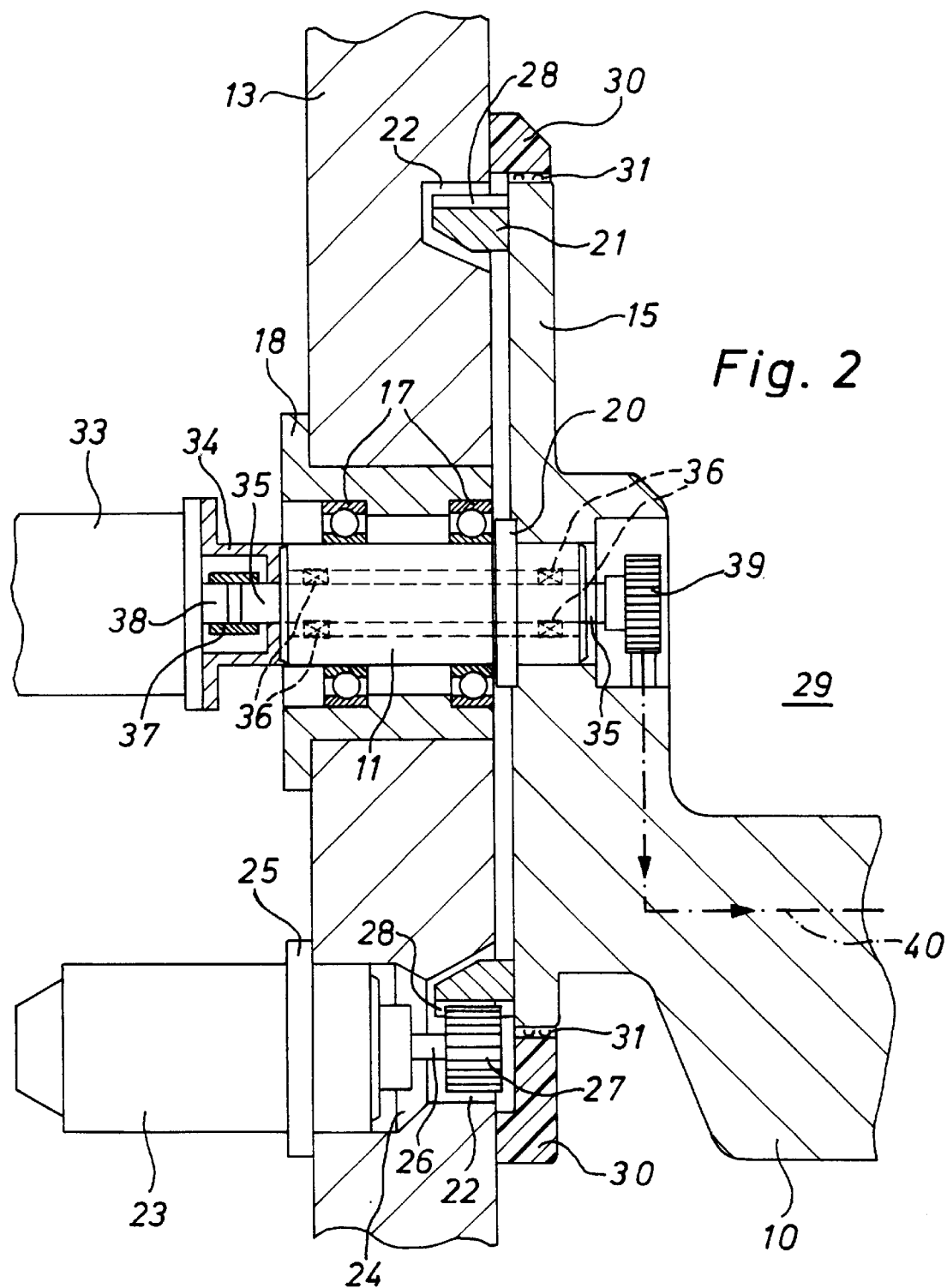
FIG. 2 shows a more detailed representation of the drive placed on the left hand bearing wall.

The workpiece holding means illustrated in FIGS. 1 and 2 for machine tools such as milling machines, or drilling machines, essentially comprises a pivoting bridge 10, which at its two opposite terminal regions possesses two bearing pins 11 and 12 turned in opposite directions. The pivoting bridge 10 is supported in a pivotal manner by means of such bearing pins 11 and 12 on two spaced apart bearing walls 13 and 14. In the case of such bearing walls 13 and 14 it may be a question of side walls of the machine tool or of side walls of a customized holding means for the pivoting bridge 10.

The two bearing pins 10 and 11 are arranged at two disk-like terminal regions 15 and 16 of the pivoting bridge 10, which are respectively positioned directly adjacent to and parallel to the bearing walls 13 and 14. As shown in the more detailed representation of FIG. 2, the bearing pins 11 and 12 are supported in anti-friction bearings 17 in bearing sleeves 18 and 19, which are respectively inserted in corresponding recesses in the bearing walls 13 and 14. The bearing pins 11 and 12 respectively fit into the disk-like terminal regions 15 and 16 and are held in same by means of flanges 20.

A gear ring 21 is mounted on the outer side, facing the bearing wall 13, of the left hand disk-like terminal region 15, the ring being screwed or pinned in place in some manner not illustrated in detail. These gear ring 21 fits in a corresponding annular recess 22 in the left hand bearing wall 13. A first drive motor 23 for pivoting the pivoting bridge 10 is inserted from the outside in a corresponding holding recess 24 in the left hand bearing wall 13 and locked in place by means of a holding flange 25. A drive gear wheel 27 driven by a drive shaft 26 of the drive motor 23 is in mesh with the radially outwardly directed teeth 28 of the gear ring 21. The drive gear wheel 27 is located in the extension of the holding recess 24, into which the first drive motor 23 is partly fitted. After detachment of the holding flange 25 the first drive motor 23 may be drawn out together with the drive gear wheel 27 outward from the left bearing wall 13.

Instead of toothed engagement between the drive gear wheel 27 and the gear ring 21 it is possible for the transmission of power to be by way of a drive chain, a toothed belt or the like.

For the protection of the drive device essentially comprising the gear ring 21 and the drive gear wheel 27 against shavings and against lubricants and coolants and the like during machining, which are present in the working area 29 between the two bearing walls 13 and 14, a sealing ring 30 is provided, which is fixed on the left hand bearing wall 13 and is so fitted about the disk-like terminal region 15 of the pivoting bridge 10 that the drive gear wheel 27 is enclosed. This sealing ring 30 is in contact by way of plain sealing face 31 or, respectively, a labyrinth seal face with the radially outwardly turned peripheral face of the terminal region 15. As an alternative to this the sealing ring 30 could also be fixed on the terminal region 15, the plain sealing face 31 being formed between the sealing ring 30 and the inner face, facing the working area 29, of the left hand bearing wall 13.

A workpiece table 32 is rotatably mounted on the pivoting bridge 10 and onto it workpieces may be clamped, the axis of rotation extending perpendicularly to the pivot axis of the pivoting bridge 10. The drive of such workpiece table 32 is in a known manner by way of a second drive motor 33, which is flange-mounted by means of a flanged cup 34 on the free terminal side of the bearing pin 11. In the interior of such bearing pin 11 a drive shaft 35 is rotatably mounted by means of anti-friction bearings 36 and at one end is connected by way of a connection member 37 with the drive shaft 38 of the second drive motor 33. The other end of the direction shaft 35 bears a gear wheel 39 driving the workpiece table 32 by way of a power transmission train 40, not illustrated in detail. Such transmission train can include drive sprocket chains, toothed belts, drive shafts or the like in a known manner.

Instead of a workpiece table 32 the pivoting bridge 10 may also possess several such workpiece tables, which are either driven by way of the same drive or by way of separate drives. For instance, for this purpose the second bearing pin 12 may be provided with a further corresponding drive device. The simplest possible design would have one pivoting bridge 10 without rotary workpiece tables 32.

The diameter of the gear ring 21 is substantially larger than that of the drive gear wheel 27 so that for this reason the speed of rotation of the first drive motor 23 would be stepped down. In case of need the first drive motor 23 may further possess a step-down transmission. This also applies from the second drive motor 33.

As a modification of the illustrated working example the drive of the pivoting bridge 10 may also be from both sides in order to reduce the torque acting of the pivoting bridge owing to the drive forces as far as possible. For this purpose the right disk-like terminal region 16 is provided with a gear ring corresponding to the gear ring 21 and in the right hand bearing wall 14 a drive motor corresponding to the first drive motor 23 is provided. The two drive motors are operated synchronously.

What is claimed is:

1. A workpiece holding means for machine tools, comprising a pivoting bridge supported between two bearing walls delimiting between them an inner working area and at least one first drive motor for pivoting the pivoting bridge, the at least one first drive motor being arranged clear of the working area on an outer side of one of the bearing walls, wherein the pivoting bridge is provided with a drive gear ring on the one of the bearing walls, the drive gear ring being drivingly connected with a drive gear wheel which is driven by the at least one first drive motor, wherein the at least one first drive motor and/or a drive shaft driven by the first drive motor and provided with the drive gear wheel extends from the outer side of the one of the bearing walls into the one of the bearing walls, wherein the drive gear ring is attached to or formed on a region of the pivoting bridge, and, a sealing ring for sealing the drive gear ring and/or the drive gear wheel between the region of the pivoting bridge and an inner side of the one of the bearing walls, an engagement face between the sealing ring and the region of the pivoting bridge or the inner side of the one of the bearing walls being in the form of a plain seal face.

2. The workpiece holding means as set forth in claim 1, wherein the gear ring and the drive gear wheel are connected together.

3. The workpiece holding means as set forth in claim 1, wherein the drive gear ring fits at least partly into a recess in one of the inner sides of the bearing walls.

4. The workpiece holding means as set forth in claim 1, wherein the pivoting bridge possesses two bearing pins, which are respectively mounted in bearing sleeves for respectively pivotally supporting the bearing pins in the two bearing walls.

5. The workpiece holding means as set forth in claim 4, wherein at least one of the bearing pins possesses a concentric motor-driven drive shaft therein, which drives at least one workpiece table, which at least one workpiece table is rotatably supported on the pivoting bridge by a power transmission train.

6. The workpiece holding means as set forth in claim 5, wherein a second drive motor for the concentric drive shaft is fixed on the at least one of the bearing pins.

7. The workpiece holding means as set forth in claim 1, wherein a diameter of the gear ring is larger than a diameter of the drive gear wheel.

8. A workpiece holding means for machine tools, comprising a pivoting bridge pivotally supported via two bearing pins between two bearing walls delimiting between them an inner working area and at least one first drive motor driving a first drive shaft for pivoting the pivoting bridge, the at least one first drive motor being arranged clear of the working area on an outer side of one of the bearing walls, wherein the pivoting bridge is provided with a drive gear ring on the one of the bearing walls, the drive gear ring being drivingly connected with a drive gear wheel which is driven by the at least one first drive motor, wherein a second drive motor for driving a second drive shaft is fixed on one of the bearing pins, wherein the at least one first drive motor and/or the first drive shaft driven by the at least one first drive motor, which is provided with the drive gear wheel, extends from the outer side of the one of the bearing walls into the one of the bearing walls, wherein the drive gear ring is attached to or formed on a region of the pivoting bridge, and a sealing ring for sealing the drive gear ring and/or the drive gear wheel between the region of the pivoting bridge and an inner side of the one of the bearing walls, an engagement face between the sealing ring and the region of the pivoting bridge or the inner side of the one bearing wall being in the form of a plain seal face.

9. The workpiece holding means as set forth in claim 8, wherein the gear ring and the drive gear wheel are connected together.

10. The workpiece holding means as set forth in claim 8, wherein the gear ring fits at least partly into an annular groove in the inner side of the one bearing wall.

11. The workpiece holding means as set forth in claim 8, wherein the two bearing pins are respectively mounted in bearing sleeves for respectively pivotally supporting the bearing pins in the two bearing walls.

12. The workpiece holding means as set forth in claim 11, wherein at least one of the bearing pins possesses a the second drive shaft, which is a concentric motor-driven drive shaft, which drives at least one workpiece table, which at least one workpiece table is rotatably supported on the pivoting bridge by a power transmission train.

13. The workpiece holding means as set forth in claim 8, wherein a diameter of the gear ring is larger than a diameter of the drive gear wheel.

14. A workpiece holding means for machine tools, comprising a pivoting bridge supported between two bearing walls delimiting between them an inner working area and furthermore at least one first drive motor for pivoting the pivoting bridge, the at least one first drive motor being arranged clear of the working area on at least one outer side of the bearing walls, wherein the pivoting bridge is provided with a drive gear ring on the at least one of the bearing walls, the drive gear ring being drivingly connected with a drive gear wheel which is driven by the at least one first drive motor, wherein at least a portion of the at least one first drive motor and a drive shaft driven by the at least one first drive motor and provided with the drive gear wheel extend from an outer side of a corresponding bearing wall into a holding recess in the corresponding bearing wall, the holding recess also containing the drive gear wheel, said at least one first drive motor, the drive shaft, and the drive gear wheel being locked in place by a holding flange.

15. The workpiece holding means as set forth in claim 14, wherein the gear ring and the drive gear wheel are connected together.

16. The workpiece holding means as set forth in claim 15, wherein the drive gear ring fits at least partly into a recess in one of the inner sides of the bearing walls.

17. The workpiece holding means as set forth in claim 15, wherein the pivoting bridge possesses two bearing pins, which are respectively mounted in bearing sleeves, for respectively pivotally supporting the bearing pins in the two bearing walls.

18. The workpiece holding means as set forth in claim 17, wherein at least one of the bearing pins possesses a concentric motor-driven drive shaft therein, which drives at least one workpiece table, which at least one workpiece table is rotatably supported on the pivoting bridge by a power transmission train.

19. The workpiece holding means as set forth in claim 18, wherein a second drive motor for the concentric drive shaft is fixed on the at least one of the bearing pins.

20. The workpiece holding means as set forth in claim 15, wherein a diameter of the gear ring is larger than a diameter of the drive gear wheel.

* * * * *